Sept. 1, 1970  D. E. SMITH  3,526,831
METHOD FOR TRACKING UNDERWATER PIPELINES AND DETECTING
FLAWS IN THE COATING THEREOF
Filed Nov. 21, 1968  3 Sheets-Sheet 1

INVENTOR.
DONALD E. SMITH
BY Edward Degas
ATTORNEY

INVENTOR.
DONALD E. SMITH

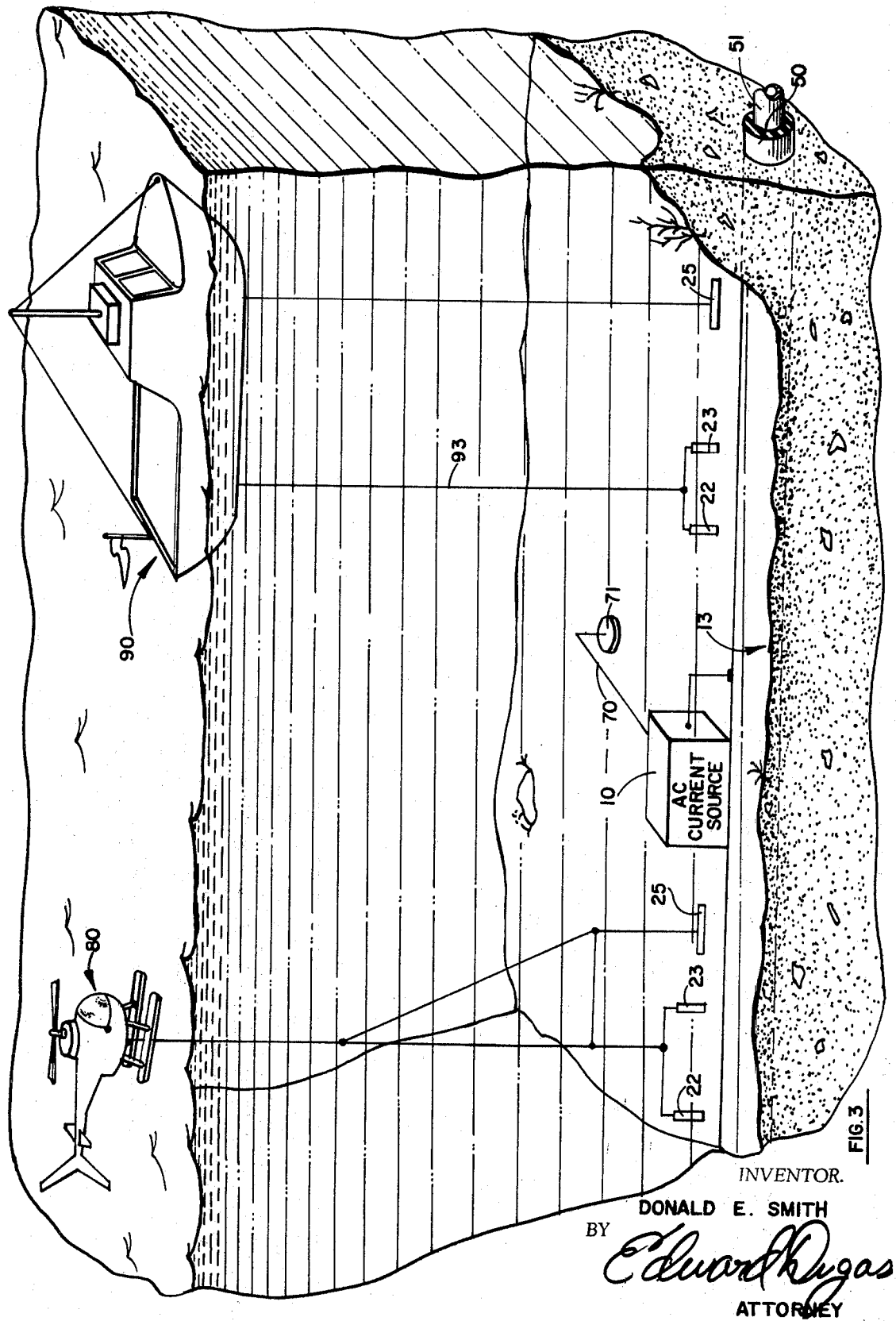

United States Patent Office 3,526,831
Patented Sept. 1, 1970

3,526,831
METHOD FOR TRACKING UNDERWATER PIPELINES AND DETECTING FLAWS IN THE COATING THEREOF
Donald E. Smith, Long Beach, Calif., assignor to North American Rockwell Corporation
Filed Nov. 21, 1968, Ser. No. 777,816
Int. Cl. G01r *31/00, 31/12*
U.S. Cl. 324—54        1 Claim

ABSTRACT OF THE DISCLOSURE

A method for detecting breaks in the plastic, non-corrosive coating of an undersea pipeline by producing in the pipeline an audio frequency current and detecting the leakage current from the pipeline by two space probes suspended from a submarine. The submarine is guided along the pipeline by a guiding system, that responds to the alternating magnetic field, produced by the audio frequency current in the pipeline, so that one probe does not wander further off the pipeline than the other and produce current signals indicating a false flaw in the coating. In addition, the speed and course of the submarine are monitored, and the position of the submarine is plotted on a recorder together with the leakage current signal so that the flaw or break in the plastic coating can be relocated and repaired.

BACKGROUND OF THE INVENTION

This invention pertains to the field of pipeline inspection and, more particularly, to a method for the inspection of pipelines that are at least partially submerged in water.

Pipelines exposed to a sea environment must be suitably protected from their hostile surroundings by coatings. These coatings vary widely as to composition and characteristics and occasionally will deteriorate from exposure to the sea environment. Flaws in coatings may also appear from impact with objects in the sea, from handling when laying, manufacturing, temperature excursions and other sources. Of course, once the coating is broken, the pipe becomes exposed directly to the sea.

Locating the existence of flaws in coated pipelines has long been a problem in the pipeline art.

In order to adequately inspect a pipeline, the pipeline must first be located. This in itself is a major problem because submerged pipelines may be partially or totally covered with mud, silt and composition of the sea bed. Low visibility in the water also restricts the ability to locate the pipe even if exposed.

Divers in the water have been used in the past for pipeline inspection. Use of divers, however, is slow and expensive in addition to being limited by underwater visibility. Also, divers cannot inspect pipelines that are partially or totally submerged in the bottom lands of the sea. The depth of water in which the pipeline inspection must take place also works adversely to diver inspection, and even precludes use of divers at depths beyond a few hundred feet.

Underwater rgs with various camera and control systems have been used for pipeline inspection. These systems suffer from complexity and the need for extensive surface support facilities, as well as underwater visibility problems. Thus, the most common way of determining the existence of a flaw in the pipeline coating is by direct observation using human beings or cameras. Besides the hardware drawback of these methods, precise information is often lost due to operator interpretation and transmission errors.

All of the above methods of pipeline inspection for flaws fail to suggest adaptability to both exposed and buried pipeline systems, using a surface or submerged vessel. The method disclosed herein has the capability of locating and inspecting exposed and buried pipeline systems and is readily adaptable for use by submerged surface or airborne vehicles. Still further, this method will work for all types of pipeline coatings, regardless of composition, including glass, concrete, rubber, composite and cloth. In addition, the method of this disclosure has been tested with actual piping emplacements and has demonstrated its workability.

SUMMARY OF THE INVENTION

In the preferred embodiment of the method, an electrical alternating current (A.C.) signal source is attached of a metal portion of a pipeline to be inspected. One output lead from the A.C. signal source is attached to the pipeline to be inspected; the other lead from the A.C. signal source is well grounded. For the inspection of submerged pipelines, optimum performance is obtained when the A.C. signal source ground is another pipeline, preferably running parallel to the pipeline to be inspected. The A.C. signal source is energized and electrical current is directed along the pipeline.

With the electrical current in the pipeline to be inspected, a probing means is passed along the length of the pipeline. The probing means has the ability to detect small currents in the water and thus current flowing from the pipeline under inspection to the ground return of the A.C. signal source can be detected. Where a flaw or break in the coating occurs, larger amounts of current go into the surrounding water and thus an increased current value is detected by the probe in the area of the flaw or break. The currents detected by the probing means are fed into an electrical receiver on board the vessel conducting the inspection. The receiver then processes and displays the received signals. The variations in received signals may be processed for any desired output such as an audio output, chart print-out, or needle deflection.

In the preferred embodiment, the probing means is kept over the pipe by means of an induction coil that detects the location of the pipe. Use of induction coils is familiar to the art of pipeline inspection and includes an induction coil being passed along the length of the pipeline in which there is an electrical current. The current in the pipeline sets up an electrical field around the pipe which can be detected by the induction coil. Suitable circuitry, internal to the induction coil unit will indicate when the magnetic field is balanced in the coils and that, therefore, the induction coil unit is directly over the pipe. Thus, means are provided in this invention for detecting both the pipeline and maintaining the probing means over the pipeline plus determining any flaws in the pipeline as the probe is passed along the length of said pipeline.

There are two ways that an electrical current can return to the ground side of the A.C. signal source. One of the ways is a current path along the pipe under inspection, then through the relatively high resistance coating that surrounds the pipe into the earth ground and back to the signal source. The other way is a path along the pipe to the point of flaw in the pipeline coating and then to the earth ground through the flaw and back to the signal source. Since the resistance to ground by the path which includes the flaw is much less than the path through the heavy insulation, an increased amount of current will flow by this route. Therefore, variations in current yield the desired information and the probing means need only sense these variations.

Means are also provided for an output that is a single permanent recording of the condition of the coating along the pipeline. This is accomplished by bringing together in a single plot the signals from the induction coil which locate the pipe and the output from the receiver which indicates the existence of a flow along the pipeline. The output from the induction coil is superimposed on the vessel's track, using a standard X–Y recorder. The output from the receiver, which is the signal from the probes after processing, is likewise superimposed on the recorder plot. The combined plots will then show graphically the position of the probes over the pipeline and more precisely the pipeline location and the location of any flaws detected on the pipeline.

Accordingly, it is the object of this method to provide an improved means for detecting flaws in the coating of a submerged pipeline.

It is a further object to provide a method for detecting pipeline flaws suitable for use by airborne, submersible and surface vessels.

In addition, an object of this invention is to provide a method of flaw detection in pipeline coatings that is effective when the pipeline is on or above the sea floor as well as when the pipeline is partially or totally buried in the sea floor.

Another object of this method is to provide a completely non-destructive means for detecting flaws in all manner of pipeline coatings.

It is a further object of this method to provide a means for tracking a pipeline and determining the flaws along the coating of the pipeline in a continuous operation.

The aforementioned and other objects of the present method will become more apparent and better understood when taken in conjunction with the following description and drawings, throughout which like characters indicate like parts, and which drawings form a part of this application.

BRIEF DESCRIPTION OF THE DRAWINGS

FIG. 3 is a perspective view showing alternate embodiments of the invention.

BRIEF DESCRIPTION OF THE PREFERRED EMBODIMENTS

Figure 1:
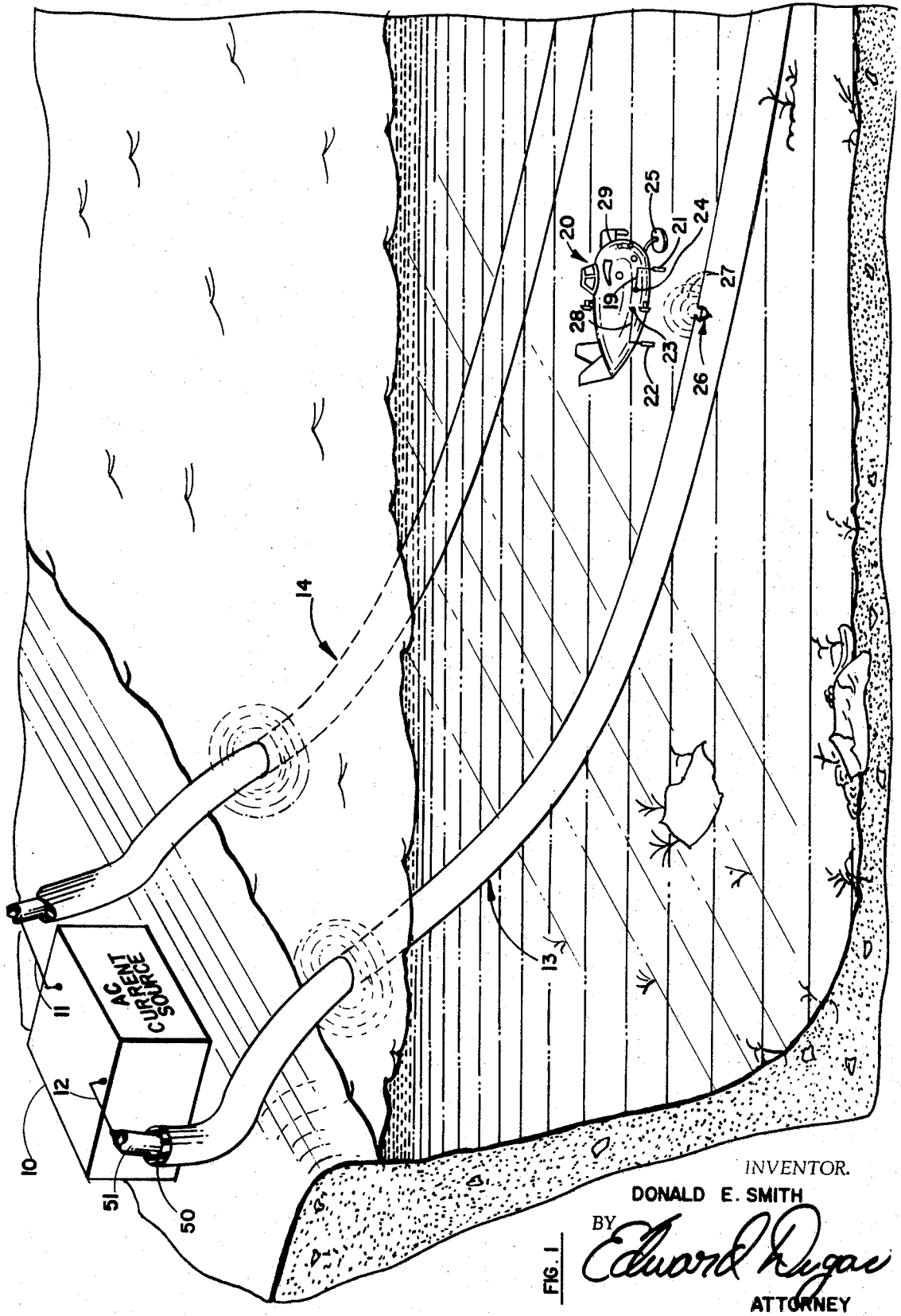
FIG. 1 is a perspective view of the major components of this method.

Referring to FIG. 1, an alternating electrical current source (A.C.) 10 is connected by a suitable conductive wire 12 to the pipeline 13 which is to be inspected. The point of attachment is to the metal 51 of the pipeline 13 and not to the coating 50. The A.C. current source 10 is also suitably grounded. An ideal grounding configuration exists when a pipeline runs parallel to the pipeline to be inspected but at some distance from it. In the preferred embodiment, the A.C. source 10 is grounded by wire 11 to another submerged pipe 14. Pipeline 14 is not under inspection.

Energizing the A.C. current source 10 causes A.C. current through the conductive wire 12 to the metal pipe 51 then through ground return to the A.C. source 10. There are two ways for current to complete the circuit via the ground pipe 14. One way is through the good portion of the high electrical resistance coating through which current travels by electrical capacity to the earth, then via the earth through grounded pipe 14 to ground wire 11 and then to the A.C. source 10. The other way is directly through coating flaws 26 where the metal pipe 51 is making relatively good contact with the earth, then to grounded pipe 14 through conductor 11 to the A.C. source 10. Since increased resistance is presented to current traveling by electrical capacity through portions of the pipe 13 having a good coating, less current will return to the A.C. source 10 by this path than will return through the relatively low resistance path offered where there is a fault 26 in the coating.

The submersible vessel 20 is suitably outfitted to detect the current flowing from the pipeline 13. Current detecting probes 21 and 22 are mounted on the submersible vessel 20 and electrically connected through conductive wires 28 and 19, through insulating penetrators 23 and 24, to processing equipment located inside the submersible vessel 20. Probes 21 and 22 are current conductors, for instance, copper bars, that provide yet another path for current seeking to return to ground through pipeline 14. Current from pipeline 13 to pipeline 14 is intercepted by probes 21 and 22 since a lower resistance path is offered by the probes than by the water.

As the submerged vessel 20 travels along the pipeline 13, electrical current in the water is detected by the probes 21 and 22. Inasmuch as very little current is conducted through the pipeline 13 where the insulation is still good, very little current is traveling to ground and available for interception by the probes. However, where the coating along the pipeline 13 is poor due to the flaw 26, an increased amount of current will be returning to ground through the water and as the probes 21 and 22 traverse this area, increased current will flow in them. This increased flow of current in probes 21 and 22 appears as an increase over the normal background current flow that the probes have carried when traversing areas of good coating along the pipeline 13.

Figure 2:
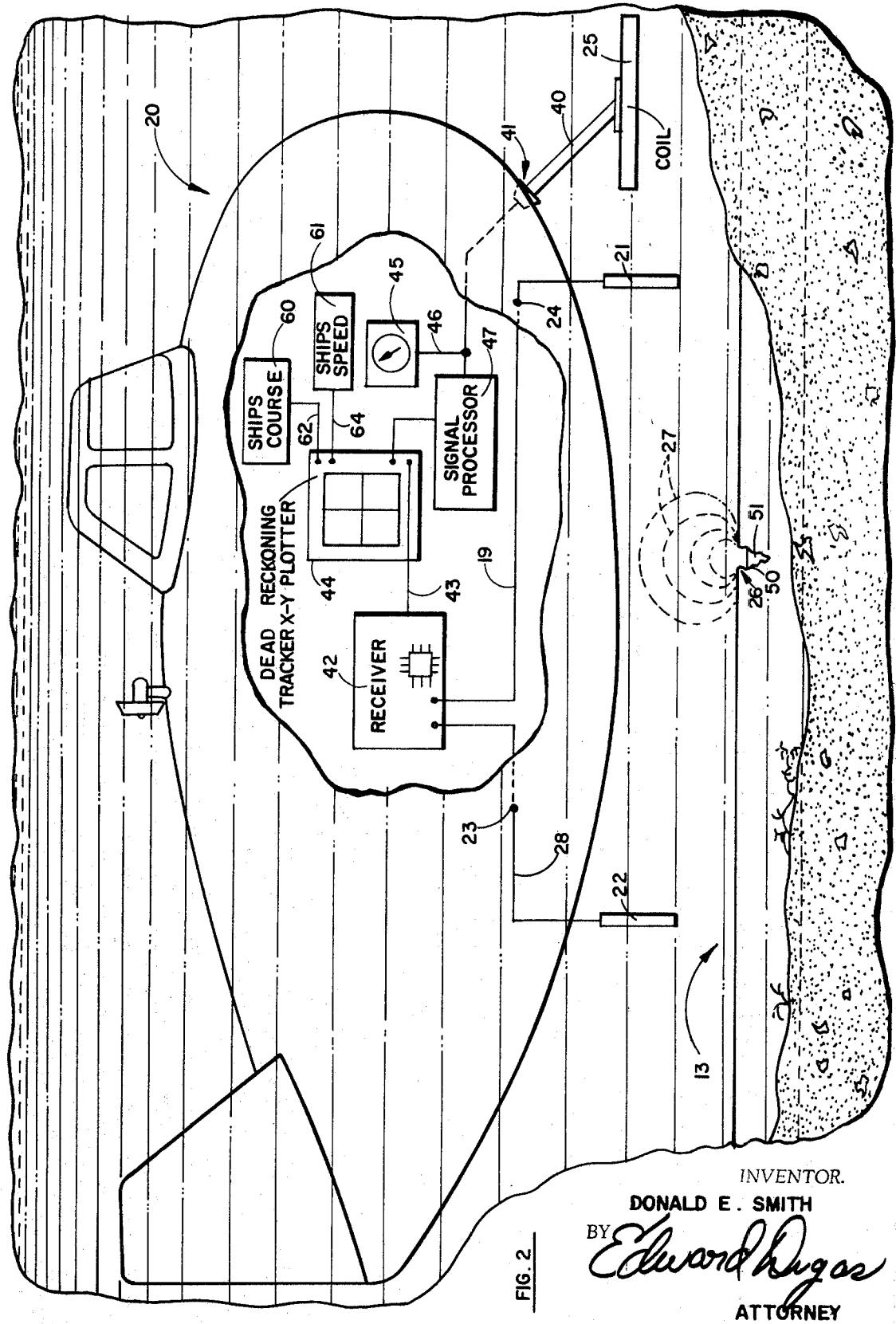
FIG. 2 is a partially sectioned view showing equipment located on the support vehicle.

Referring now to FIG. 2, current flowing in probe 21 is led by conductor 19 through the insulating penetrator 24 into receiver 42 located onboard the submersible vessel 20. Similarly, current flowing in probe 22 is led via conductor 28 through the insulating penetrator 23 into the receiver 42. In receiver 42, the received signals may be processed in any manner desired to provide useful representation of the current in the probes 21 and 22. For instance, the current in each probe could be presented as a meter needle deflection, or as a permanent chart print-out, or as a variation in an audio signal. A strip chart recorder provides a useful print-out inasmuch as peak current flows in each probe as that probe is in closest proximity to the coating flaw and can easily be represented as a function of distance traveled.

In operation, this means that as the leading probe passes over the flaw 26, its maximum current reading will be obtained and then as it moves away from the flaw, the reading will decrease. As the after probe approaches the flaw, its current reading will increase until it is directly over the flaw and then will decrease as the submersible travels further along the pipe. By having a permanent recording of each of the current levels from the two probes, and noting the two peaks of current in the probes, and then interpolating between the two peak current values shown on the strip chart, the precise location of the coating flaw is pinpointed as midway between the two peaks.

Another electrical phenomenon which results from a current flowing in the pipeline under inspection, is used to locate and maintain the probes directly over the pipeline. This phenomenon, familiar to those skilled in the art, recognizes the fact that a magnetic field exists at right angles to a current carrying conductor such that the magnitude of the magnetic field is proportional to the current in the conductor. An induction coil placed in this magnetic field will indicate the existence of the magnetic field and if suitably calibrated will indicate the magnitude of the magnetic field. Need for calibration is eliminated, however, if two coils are placed in the magnetic field and arranged to provide a null indication in accordance with well known search coil method. A two coil search unit 25, when suitably configured, provides a null indication when the unit is directly over the current carrying means. The current flowing in each of these induction coils, as a result of them being in a magnetic field, is equal when they are in an equal magnetic field. Seach coil circuitry is well known in the prior art and search coil means for locating pipes underground has long been used by the industry.

Referring again to FIG. 2, a sophisticated means for handling the various signals received on board the submersible 20 is shown. Dead reckoning trackers are familiar to persons skilled in the art and provide a two-dimensional plot of the motions of a vehicle when the vehicle course and speed information fed into a plotting means such as an X–Y recorder. This plot provides a record of the path the vehicle has followed. The signal from the search unit 25 is fed into the submersible via conductors 40 through insulating penetrator 41 and into single processor 47 where the signal is suitably processed for input to the dead reckoning tracker 44. The signal processing that takes place in signal processor 47 is not new and merely prepares the signal from the search unit 25 for use by the dead reckoning tracker 44. Since the search unit 25 gives an indication of when the submersible 20 is either right or left of the pipe center line, this same information can be inserted into the dead reckoning tracker 44 and superimposed on the submersible's track to show when the actual track was to the right or left of the pipe center line. A deflection meter 45 also provides visual indication of variations from the right or left of the center line as indicated by the search unit for operator use in maintaining the submersible over the pipeline.

The current signals detected by probes 21 and 22, after being suitably processed by receiver 42, can also be electrically connected by conductor 43 to the dead reckoning tracker 44. By this means, variations in the current flowing through the probes will also be recorded on the plot. Thus all information connected with a single survey is integrated into a single permanent plot. That is, the submersible track, the variation from directly over the pipeline, and the recordings indicating the existence of the flaw in the coating are recorded. Although the preferred embodiment depicts an X–Y format dead reckoning tracker, any suitable means of plotting may be used including a continuous plotting strip recorder.

FIG. 3 illustrates some variations from the preferred embodiment that are also within the scope of this method. The A.C. source 10 need not be connected to a point on the pipeline to be inspected 13 above the water, and in fact may be atached below the water line. In addition, if another pipeline is not available that travels parallel, or nearly so, to the pipeline under inspection, an alternate grounding means 71 may be used whereby any large metal object that may provide good contact with the ocean floor is connected by a conductor 70 to the A.C. source 10.

A surface vessel 90 may be used in lieu of the submerged vessel 20. The search unit 25 and probes 22 and 23 can be electrically connected by conductors 94 and 93, respectively, to equipment carried on the vessel 90. Use of a surface ship is particularly applicable for inspections of pipelines in shallower waters where insufficient depths exist for safe maneuverability of a submersible and where minimum control control problems exist in keeping the surface ship probe array over the pipeline.

In very restricted areas or areas of severe accessibility, airborne means 80 can be used as a support platform for the probe and search coil array.

While there has been shown what are considered to be the preferred embodiments of the method of this invention, it will be manifest that many changes and modifications may be made therein without departing from the essential spirit of the invention. It is intended, therefore, in the annexed claims, to cover all these changes and modifications as may fall within the true scope of the invention.

What is claimed is:

1. A method for determining the existance of flaws in the coating of an underwater pipeline comprising the steps of:

causing in said pipeline, by means of an alternating electrical current source, an electrical current at some frequency between 10 and 3000 cycles per second, providing a return path for said current to the alternating current source, moving a submarine over said pipeline, guiding said submarine to follow said pipeline by use of a position sensor that senses the alternating magnetic field that exists around said pipeline by virtue of said electrical current therein, detecting the leakage current from said pipeline by a pair of current detectors on said submarine, monitoring the speed and course of the submarine, plotting the course of said submarine on a plotter in response to information given by said monitoring step, and plotting the leakage current on said plotter in response to the information given by said detecting step.

References Cited

UNITED STATES PATENTS

| | | | |
|---|---|---|---|
| 1,297,929 | 3/1919 | Taylor | 324—67 XR |
| 1,344,074 | 6/1920 | Williams | 324—67 XR |
| 1,696,230 | 12/1928 | Gilbert | 324—67 XR |
| 1,745,419 | 2/1930 | Henneberger | 324—52 XR |
| 2,834,113 | 5/1958 | En Dean et al. | |
| 3,020,470 | 2/1962 | Shawhan et al. | 324—3 |
| 3,052,837 | 9/1962 | Arbogast et al. | 324—3 |
| 3,066,256 | 11/1962 | Rasor | 324—67 XR |
| 3,338,059 | 8/1967 | Tittle | 324—3 XR |
| 3,418,572 | 12/1968 | Humphreys | 324—67 |

FOREIGN PATENTS 188,676   12/1922   Great Britain.

GERARD R. STRECKER, Primary Examiner

U.S. Cl. X.R.

324—3, 52